Jan. 11, 1966 R. G. CURTIS ETAL 3,229,201
INCREASED RESOLUTION TIME INTERVAL MEASURING SYSTEM
Filed Aug. 21, 1961 3 Sheets-Sheet 1
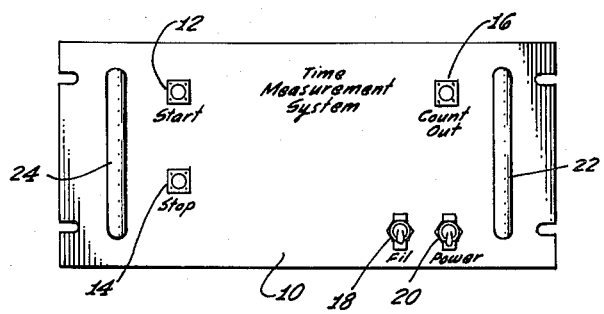
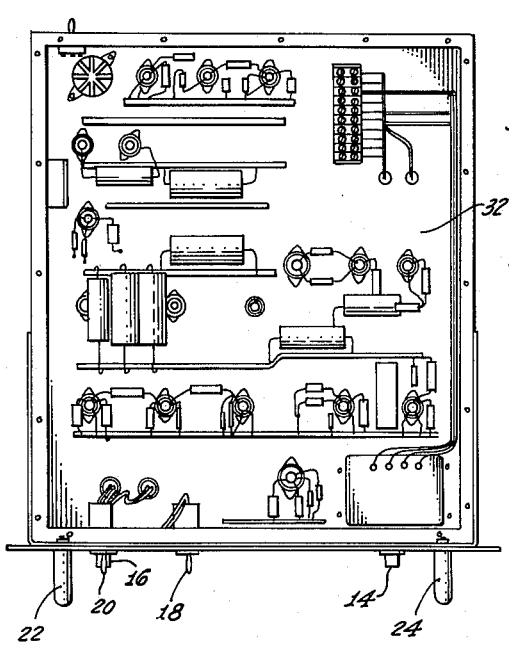
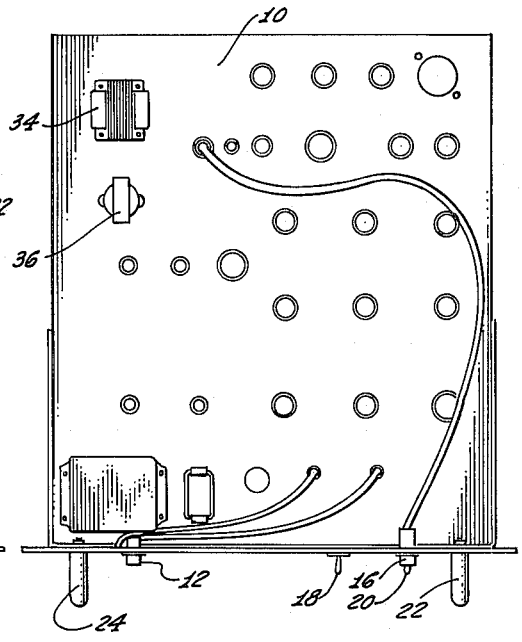
INVENTORS:
Robert G. Curtis
Sheldon W. Gates
By Mueller & Aichele
Attorney

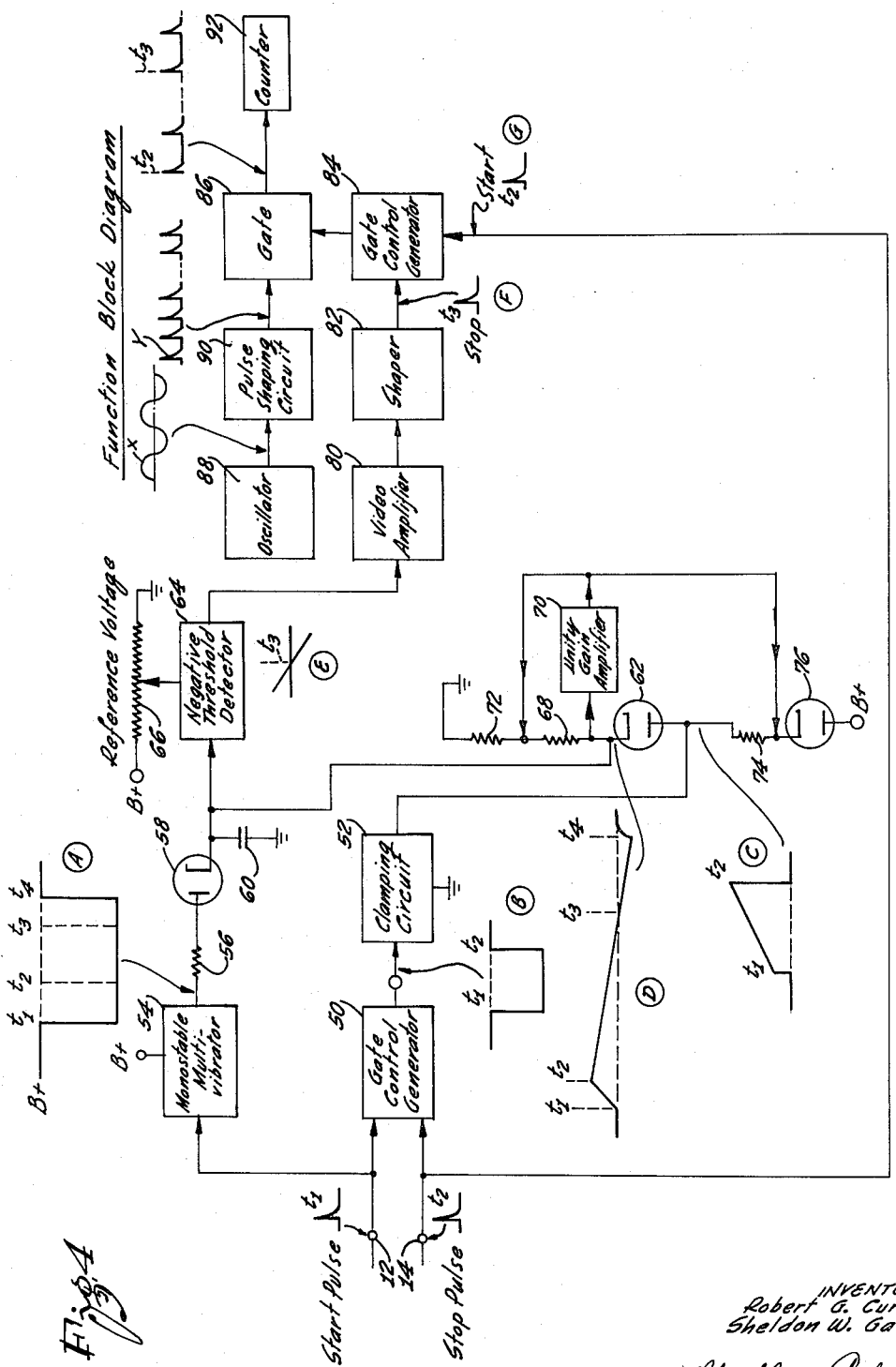

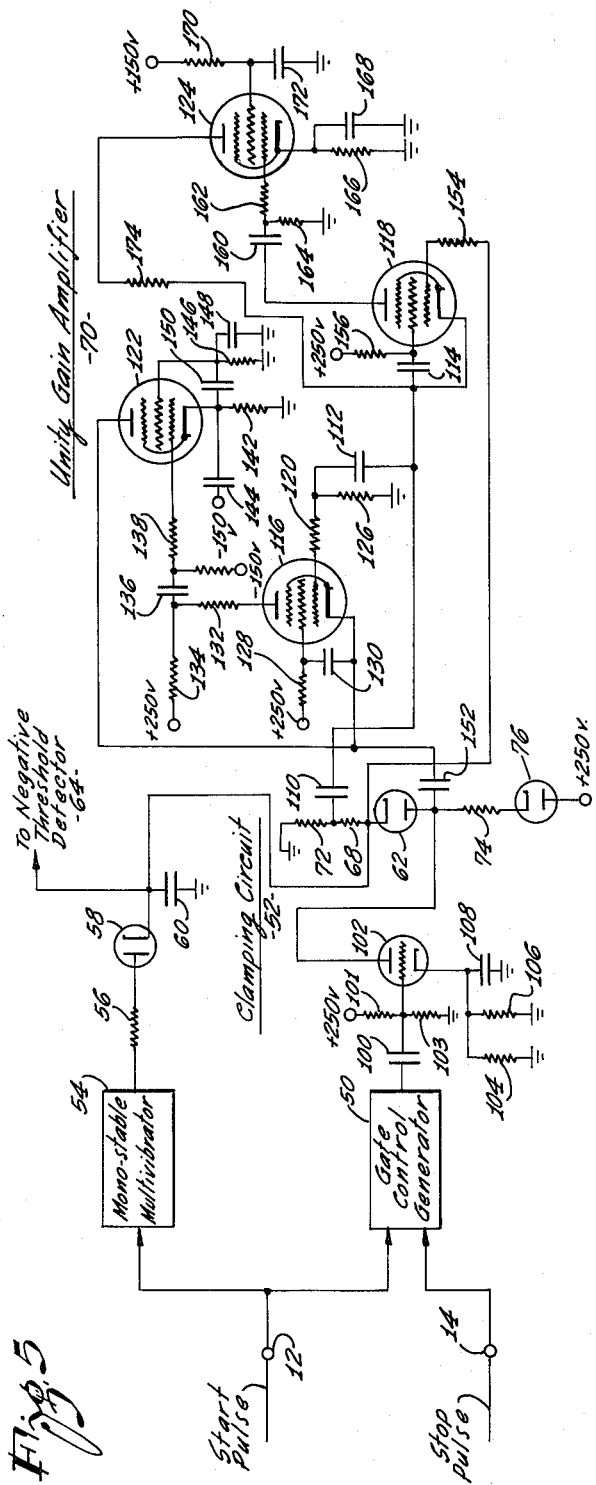
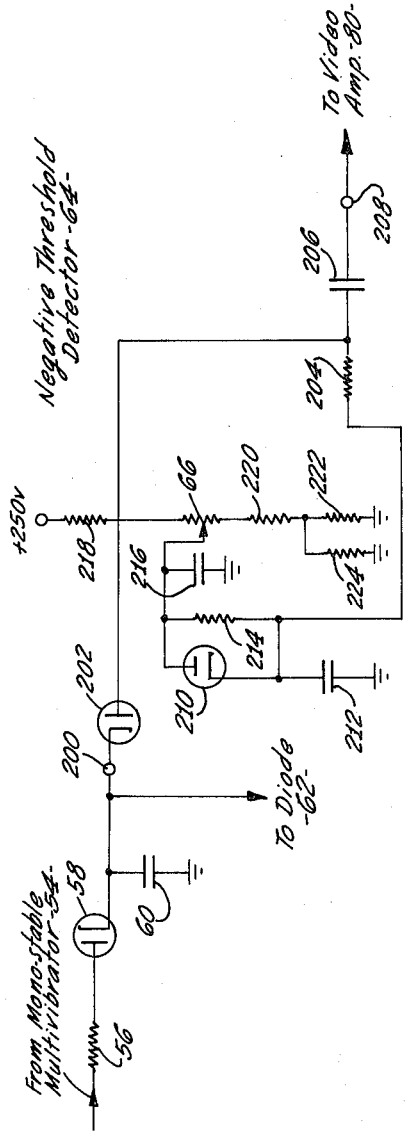
Fig. 5
Fig. 6
INVENTORS:
Robert G. Curtis
Sheldon W. Gates
By Mueller & Aichele
Attorney

United States Patent Office 3,229,201
Patented Jan. 11, 1966

3,229,201
INCREASED RESOLUTION TIME INTERVAL MEASURING SYSTEM
Robert G. Curtis, Scottsdale, and Sheldon W. Gates, Phoenix, Ariz., assignors to Motorola, Inc., Chicago, Ill., a corporation of Illinois
Filed Aug. 21, 1961, Ser. No. 132,939
4 Claims. (Cl. 324—68)

The present invention relates to an improved time interval measuring system, and it relates more particularly to an improved system for accurately measuring the time interval between a "start" pulse and a "stop" pulse.

The improved time interval measuring system of the invention has a wide field of utility wherever the precise measurement of extremely small time intervals is required. In the embodiment to be described, for example, the unknown time interval is measured by means of a counter which counts the number of pulses introduced to it during a time interval which is a known multiple of the unknown time interval.

In practicing the concepts of the present invention it is possible, for example, to measure time intervals to milli-microsecond accuracy by means of standard 1 megacycle counters. For that reason, the improved system of the invention extends the capabilities of standard, relatively inexpensive low frequency counters to correspond with the capabilities of the much higher frequency, more expensive type of counter operating in the usual prior art time interval measuring system.

The time interval measuring system of the invention is predicated upon "time stretching" principles. The beginning of the unknown time interval which is to be measured is represented by a "start" pulse, and the end of the unknown time interval is represented by a "stop" pulse. The system of the invention effectively multiplies the unknown time interval between the "start" and "stop" pulses by a particular known multiple. Signals representative of the resulting extended time interval are then used to gate a train of pulses to the low frequency counter.

In the embodiment to be described, the improved time interval measuring system of the invention includes a capacitor which is initially charged to a particular level. During the time interval between the "start" and "stop" pulses, the charge level on the capacitor increases at a predetermined linear rate. After the occurrence of the "stop" pulse, the capacitor discharges back to its initial level at a predetermined linear rate which is slower than the charging rate. The slope of the discharge curve of the capacitor is a particular, known multiple of the slope of the charge curve. Therefore, by measuring the relatively long discharge time of the capacitor, the relatively short charge time of the capacitor (which corresponds to the actual interval to be measured) can be precisely determined.

In a constructed embodiment of the invention, time intervals in the range of from 0.2–25 microseconds were precisely measured by a standard 1 megacycle counter and with ±40 millimicroseconds accuracy.

The time interval measuring system of the invention finds utility in a wide variety of applications, such as in analog computers to extend the range of time-measuring pulse counters, in radar as a sweep expander, and in other fields and applications too numerous to enumerate.

It is, accordingly, an object of the present invention to provide an improved time interval measuring system for accurately measuring relatively short time intervals by producing a count which accurately and precisely represents a predetermined multiple of the relatively short time interval.

Another object of the invention is to provide an improved time interval measuring system which is capable of effectively multiplying an unknown, extremely small time interval by a particular multiple, and of providing a resulting output which can be measured by standard measuring instruments which do not have the normal capabilities for directly measuring the minute time interval.

Another object of the invention is to provide such an improved time interval measuring system which is relatively uncomplicated in its circuit composition and which utilizes a minimum of components.

Yet another object is to provide such an improved time interval measuring system which is capable of precisely measuring minute time intervals, and yet which utilizes standard, commercial grade, readily available stock item components.

A feature of the invention is the provision of a capacitor circuit for effectively generating a pair of ramp signals corresponding respectively to the charging and discharging of the capacitor, the capacitor circuit being used in conjunction with a single power supply so that the common sources of error, namely capacitor variations and power supply fluctuations, tend to cancel out and to be respectively self-neutralizing.

An ancillary feature to the provision for the self-neutralizing of errors mentioned in the preceding paragraph is the provision of an accurate and precise time interval measuring system which permits the use of commercial grade, stock items in the system without militating against the precision of the system in effectively measuring small time intervals.

Yet another feature of the invention is the provision of a time interval measuring system which is so conceived to utilize "time stretching" techniques so as to permit a simple read-out of the time interval information to be possible by standard relatively low-frequency digital counters.

A further feature of the invention is the realization of a high degree of accuracy and precision in the time interval measuring system of the invention with relatively simple and uncomplex circuitry.

The above and other features of the invention which are believed to be new are set forth in the claims. The invention itself, however, together with its further features and advantages, may best be understood by reference to the following description, when taken in conjunction with the accompanying drawings, in which:

FIGURE 1 is a front panel view of a constructed embodiment of the invention;

FIGURE 2 is a bottom view of the constructed embodiment of FIGURE 1;

FIGURE 3 is a top view of the constructed embodiment of FIGURE 1;

FIGURE 4 is a block diagram of one embodiment of the invention;

FIGURE 5 is a circuit diagram of a portion of the system of FIGURE 4; and

FIGURE 6 is a circuit diagram of one of the components of the system of FIGURE 4.

The relative simplicity of the time interval measuring system of the present invention will be appreciated from the illustrated constructed embodiment in FIGURES 1–3. As shown, the embodiment includes a front panel 10 which includes a first plug 12 for receiving an input connection which applies the start pulse to the system, and a second plug 14 for receiving a connection which applies the stop pulse to the system.

Also mounted on the front panel 10 is a plug 16 to which may be coupled a usual standard digital pulse counter. As mentioned above, the counter may be of a usual 1 megacycle type. The filament and power switches 18 and 20 complete the components mounted on the front panel. That is, with the exception of a pair of handles 22 and 24.

As shown in FIGURE 2, all the circuit components are mounted on the underside of the chassis 32 of the illustrated embodiment. As illustrated in FIGURE 3, the various discharge tubes which form the different components of the system are mounted on the upper side of the chassis 32, as are appropriate transformers 34 and 36 which are used in the system.

The plug 12, which receives the connection which applies the start pulse to the system, is illustrated as an input terminal in the block diagram of FIGURE 4, and the plug 14 which receives the connection which applies the stop pulse to the system is also represented as an input terminal. The plugs, or input terminals, 12 and 14 are connected to the corresponding terminals of a gate generator 50. This gate generator may be a bi-stable multivibrator circuit, and it may be of the type commonly referred to as a flip-flop.

A "start" pulse introduced to the input terminal 12 causes the gate generator 50 to assume a first stable state, and a "stop" pulse introduced to the input terminal 14 causes the gate generator 50 to assume a second stable state. The voltage appearing at the output terminal of the gate generator 50 has a first value when the gate generator is in its first stable state, and it has a second value when the gate generator is in its second stable state. This output terminal is coupled to a clamping circuit 52 which may have any appropriate well-known circuit composition.

The input terminal 12 is also coupled to a monostable multivibrator 54 of any appropriate known construction, and the output terminal of the monostable multivibrator 54 is direct-current coupled to a resistor 56. The monostable multivibrator 54 is also connected to the positive terminal B+ of a source of direct current exciting potential. The resistor 56 is connected to the anode of a diode 58. The cathode of the diode 58 is connected to a capacitor 60, this capacitor being connected to a point of reference potential such as ground.

The clamping circuit 52 is also connected to the point of reference potential, such as ground. The output terminal of the clamping circuit is connected to the anode of a diode 62, and the cathode of the diode 58 is further connected to the cathode of the diode 62, and to the input terminal of a negative threshold detector 64. The negative threshold detector 64 may incorporate suitable known circuitry, and it includes a potentiometer 66 which is connected between the positive terminal B+ and ground.

The cathode of the diode 62 is connected to a resistor 68 and to the input terminal of a unity gain amplifier 70. The amplifier 70 may incorporate usual, known, circuitry. The resistor 68 is connected to a resistor 72 which, in turn, is connected to the point of reference potential, such as ground. The anode of the diode 62 is connected to a resistor 74 which, in turn, is connected to the cathode of a diode 76. The anode of the diode 76 is connected directly to the positive terminal B+ of the source of direct current potential. The output terminal of the unity gain amplifier 70 is connected to the common junction of the resistors 68 and 72, and the output terminal is also connected to the cathode of the diode 76.

The output terminal of the negative threshold detector 64 is connected to a video amplifier 80 which incorporates suitable known circuitry and which, in turn, is coupled to a usual pulse shaper circuit 82. The resulting pulse output of the shaper 82 is connected to an input terminal of a bi-stable gate control generator 84. The gate control generator 84, like the gate control generator 50, may be any suitable known type of flip-flop circuit. The pulse shaper circuit 82 provides an output pulse which serves to set the gate control generator 84 to a first stable state. The input terminal 14 introduces a "stop" pulse to the gate control generator 84 to set the generator 84 to its second stable state.

The output terminal of the gate control generator 84 is connected to a gate 86, and the gate 86 serves to pass clock pulses from a pulse shaping circuit 90 to a counter 92; the pulse shaping circuit 90 being coupled to an oscillator 88. However, the gate 86 passes the clock pulses to the counter 92, only when the gate control generator 84 is in one of its two stable states.

The oscillator 88 may be a usual 1 megacycle crystal controlled oscillator. This oscillator generates a 1 megacycle sine wave, as shown by the curve X, and this sine wave is converted into clock pulses Y by the pulse shaping circuit 90.

In its quiescent state, and as shown by the curve A in FIGURE 4, the monostable multivibrator 54 establishes the left hand terminal of the resistor 56 at the potential level of the terminal B+ of the direct current source. The resistors 56, 68 and 72 constitute a voltage divider. The values of these resistors are such, for example, that the capacitor 60 is initially charged to a potential level which is approximately one-half the potential level of the terminal B+. The reference voltage potentiometer 66 of the negative threshold detector 64 is adjusted to the same potential level as the initial potential level of the capacitor 60.

When the system is in a quiescent condition, the monostable multivibrator 54 is in its stable state, and the gate control generator 50 is in its first stable state. In this first stable state of the generator 50, as shown by the curve B in FIGURE 4, the clamping circuit 52 is conductive, and the anode of the diode 62 is held by the clamping circuit at a positive potential level which is slightly below the potential across the capacitor 60. Under these quiescent conditions, therefore, the diode 62 is non-conductive.

When the system is in the quiescent condition referred to in the preceding paragraph, the oscillator 88 and the pulse shaping circuit 90 cause clock pulses to be applied to the gate 86. These clock pulses, as noted above, may have a repetition rate, for example, of 1 megacycle. The gate 86 is controlled by the gate control generator 84. However, for the quiescent condition of the system, the gate control generator 84 is in its first stable state, so that the gate 86 is disabled and no clock pulses are applied to the counter 92.

The start pulse applied to the input terminal 12 is assumed to occur at a time $t_1$. This pulse is applied to the monostable multivibrator 54, and it triggers the multivibrator 54 from its stable state to its unstable state. When the monostable multivibrator 54 is in its unstable state, it establishes the left hand terminal of the resistor 56 at a potential lower than the potential level across the capacitor 60. The diode 58 is, therefore, rendered non-conductive upon the occurrence of the start pulse.

The occurrence of the start pulse at the input terminal 12 also sets the gate control generator 50 to its second stable state. This causes the output potential from the control generator 50 to drop which, in turn, causes the clamping circuit 52 to be cut off. The potential at the anode of the diode 62 rises instantly toward the potential of the B+ source, and this rise continues until the rising voltage is clamped by the diode 62 at the potential level across the capacitor 60. This rise of the potential at the anode of the diode 62 towards the positive potential B+ occurs at time $t_1$ as shown by the curve C, and it is due to the path established through the diode 76 and through the resistor 74.

The value of the resistor 74 is made much smaller than the sum of the values of the resistors 68 and 72 so that the charge time of the capacitor 60 will be much less than its subsequent discharge time. For example, the resistance of the resistor 74 may be 1% of the sum of the resistances of the resistors 68 and 72.

When the clamping circuit 52 is rendered non-conductive, as mentioned above, so that the diode 62 becomes conductive, the capacitor 60 starts to charge to a higher potential level than the quiescent potential level originally established across the capacitor, as mentioned above. This is shown by the curve C of FIGURE 4. The capacitor 60 attempts to increase its charge to a level corresponding to:

$$\frac{R2+R4}{R1+R2+R4} \cdot B + \cdots \qquad (1)$$

where:

R2 is the resistance of the resistor 68;
R4 is the resistance of the resistor 72; and
R1 is the resistance of the resistor 74.

However, as the potential across the capacitor 60 starts to increase, the unity gain amplifier 70 raises the potential at the cathode of the diode 76. This causes the diode 76 to control the charging current through the resistor 74, so as to assure that the charging current is held constant. This circuit assures that the charge potential level across the capacitor 60 will increase at a precisely linear rate. The action is that of a usual positive-going bootstrap ramp generator, and it is believed unnecessary to describe the circuit in any further detail.

The charge potential level across the capacitor 60 increases at a linear rate until the occurrence of the stop pulse at the input terminal 14. This stop pulse is assumed to occur at a time $t_2$. At this instant, the gate control generator 50 is set to its second stable state, as shown by the curve B, and the clamping circuit 52 is again rendered conductive. This causes the potential at the anode of the diode 62 to be returned to its initial value, so that the diode 62 is again rendered non-conductive. This is shown by the curve C in FIGURE 4.

At the same time, the stop pulse also activates the gate control generator 84 to set that generator to its first stable state. As mentioned above, this causes the gate 86 to start passing the clock pulses from the pulse shaping circuit 90 to the counter 92. The counter 92 begins counting the relatively slow rate clock pulses.

After the occurrence of the stop pulse at the input terminal 14, both the diodes 76 and 62 are cut off, as is the diode 58. The capacitor 60, therefore, will begin to discharge through the resistors 68 and 72, and the charge potential level across the capacitor will begin to fall toward ground potential (see curve D). As the capacitor 60 discharges, the unity gain amplifier 70 reduces the voltage at the junction of the resistors R2 and R4 by an equal amount, to assure that the discharge current through the resistor R2 is a constant. This assures that the discharge ramp signal will be precisely linear. The negative-going bootstrap ramp generator operates similarly to the positive-going ramp generator described above.

The diode 58 remains cut off after a time $t_3$ and until a time $t_4$; the time $t_4$ corresponding to the time at which the monostable multivibrator 54 returns from its unstable to its stable state. This time interval is made much greater than the actual time interval ($t_1-t_2$) to be measured, and greater than the time interval ($t_2-t_3$) measured by the negative-going ramp signal described above. Therefore, the capacitor 60 will discharge to a voltage lower than its initial quiescent value. As the potential level across the capacitor 60 passes the threshold value previously set, an output is generated by the negative threshold detector 64. This occurs at the time $t_3$, as shown by the curves D and E in FIGURE 4.

The output from the negative threshold detector 64 at $t_3$ time is amplified by the video amplifier 80 and is shaped by the shaper 82. The resulting sharp pulse, shown by the curve F in FIGURE 4 is applied to the gate control generator 84 to return that generator to its second stable state. Therefore, the stop pulse occurring at time $t_2$, as shown by the curve G in FIGURE 4 serves to set the gate control generator 84 to a state in which the gate 86 is enabled. This permits the counter 92 to start counting the clock pulses passed through the gate. Subsequently, the pulse developed by the shaper 82 returns the gate control generator 84 to its second state, so that the gate 86 is disabled, and no further clock pulses are applied to the counter 92. The counter 92, therefore, counts the number of clock pulses which occur during the time designated by the negative-going ramp signal of curve D, and which occurs between the times $t_2$ and $t_3$.

At the time $t_4$, the monostable multivibrator 54 resets to its stable quiescent condition, and the system is returned to its quiescent state, and is ready to receive the next pair of start and stop pulses.

Because the resistances of the resistors 68 and 72 are much larger than the resistance of the resistor 74, the positive-going ramp signal has a slope which is much steeper than the slope of the negative-going ramp signal. If the initial voltage level across the capacitor 60 is assumed to be one-half the potential level between the positive terminal B+ and the junction of the resistors 72 and 68, the discharge time will be equal approximately to $R1/R2$ times the charge time. Therefore, the time multiplication in the system is determined by the selection of the values of the resistors 68 and 74, and by the initial potential level across the capacitor 60.

A large multiplication permits sufficient number of clock pulses to control the counter 92, so that extreme accuracy of measurement may be obtained from usual, standard digital counters of reasonable counting rate capabilities.

It should be noted that variations in the capacity of the capacitor 60, and fluctuations in the potential level of the terminal B+ will tend to be self-neutralizing. This obtains, because such changes directly influence both the positive-going and negative-going ramp signal rates. In addition, if the unity gain amplifier 70 exhibits other than unity gain, a portion of the resulting error signal also cancels out.

The clamping circuit 52 of FIGURE 4 and the unity gain amplifier 70 are shown in circuit detail in FIGURE 5. As illustrated in FIGURE 5, the monostable multivibrator 54 is connected through the resistor 56 to the anode of the diode 58. The resistor 56 may have a resistance, for example, of 1200 kilo-ohms. The gate control generator 50, on the other hand, is coupled through a capacitor 100 to the control grid of a triode 102 included in the clamping circuit 52. The control grid of the triode is connected to the common junction of a pair resistors 101 and 102. These resistors are connected as a voltage divider between the positive terminal of a 150 volt direct current source and ground. The capacitor 100 may have a capacity of .01 microfarad, for example. The resistor 101 may have a resistance of 2.2 megohms, and the resistor 103 may have a resistance of 1 megohm. The cathode of the triode 102 is connected to the junction of a pair of grounded resistors 104 and 106, and to a grounded capacitor 108. The resistor 104 may have a resistance of 33 kilo-ohms, and the resistor 106 may have a resistance of 4700 ohms. The capacitor 108 may have a capacity of 20 microfarads.

The anode of the triode 102 is connected to the junction of the anode of the diode 62 and the resistor 74. The resistor 74 may have a resistance of 11.34 kilo-ohms, and that resistor is connected to the cathode of the diode 76, as described above. The cathode of the diode 58 is connected to the grounded capacitor 60, as described, and to the cathode of the diode 62. The capacitor 60 may have a capacity of 3900 micro-microfarads, for example.

The cathode of the diode 58 is also connected to the negative threshold detector 64, the circuit details of which will be described in conjunction with FIGURE 6. The cathode of the diode 62 is connected to ground through the resistors 68 and 72, as described. The resistor 68 may have a resistance of 1.2 megohms, and the resistor 72 may have a resistance of 100 kilo-ohms.

The junction of the resistors 68 and 72 is coupled through a coupling capacitor 110, and through a pair of respective coupling capacitors 112 and 114, to the control grid of a pentode 116 and to the screen electrode of a pentode 118, respectively. An amplitude limiting resistor 120 is interposed between the capacitor 112 and the control grid of the pentode 116. The pentodes 116 and 118, together with additional pentodes 122 and 124 are included in the unity gain amplifier 70 described above in conjunction with FIGURE 4. The capacitor 110 may have a capacity of 3 microfarads, and the capacitors 112 and 114 may each have a capacity of 1 microfarad. The resistor 120 may have a resistance of 10 ohms. A grounded resistor 126, which may have a resistance of 510 kilo-ohms, is connected to the common junction of the resistor 120 and the capacitor 112.

The screen electrode of the pentode 116 is connected through a resistor 128 to the positive terminal of a 250 volt direct current source, the resistor 128 having a resistance of 47 kilo-ohms, for example. The screen electrode of the pentode 116 is by-passed to the cathode through a capacitor 130, this capacitor having a capacity of .1 microfarad, for example. The suppressor electrode of the pentode 116 is connected to the cathode, and the anode of the pentode is connected through a resistor 132 and through a resistor 134 to the positive terminal of the 250 volt direct current source. The resistor 132 may have a resistance of 10 ohms, and the resistor 134 may have a resistance of 6200 ohms.

The junction of the resistors 132 and 134 is coupled through a capacitor 136 and through a resistor 138 to the control grid of the pentode 122. The capacitor 136 may have a capacitance of, for example, .01 microfarad, and the resistor 138 may have a resistance of 10 ohms. A resistor 140, which may have a resistance of 1 megohm, is connected from the junction of the capacitor 136 and resistor 138 to the negative terminal of the 150 volt direct current source.

The cathode of the pentode 122 is connected through a resistor 142 to the negative terminal of the 150 volt direct current source and through a capacitor 144 to that terminal. The resistor 142 may have a resistance of 47 kilo-ohms, and the capacitor 144 may have a capacitance of .1 microfarad.

The screen electrode of the pentode 122 is connected to a grounded resistor 146 which is by-passed to ground by a capacitor 148. A further capacitor 150 is coupled to the screen electrode and to the cathode of the pentode 122. The resistor 146 may have a resistance of 6800 ohms, and the capacitor 148 may have a capacity of 1 microfarad. The capacitor 150 may have a capacity of .1 microfarad. The suppressor electrode of the pentode 122 is connected to the cathode, and the anode is connected to the cathode of the pentode 116 and through a coupling capacitor 152 to the anode of the diode 62. The coupling capacitor 152 may have a capacity of .1 microfarad.

The cathode of the diode 62 is connected through a resistor 154 to the control grid of the pentode 118. The resistor 154 may have a resistance of 10 ohms. The screen electrode of the pentode 118 is connected through a resistor 156 to the positive terminal of the 250 volt direct current source. This resistor may have a resistance of 24 kilo-ohms. The suppressor electrode of the pentode 116 is connected to the cathode, and the anode is connected to a resistor 158. The resistor 158 may have a resistance of 10 ohms, and it is coupled through a capacitor 160 and through a resistor 162 to the control electrode of the pentode 124. The capacitor 160 may have a capacity of .1 microfarad, and the resistor 162 may have a resistance of 10 ohms. The junction of the capacitor 160 and resistor 162 is connected to a grounded resistor 164 which may have a resistance of 1 megohm.

The cathode of the pentode 124 is connected to a grounded resistor 166 which is shunted by a capacitor 168. The resistor 166 may have a resistance of 220 ohms, and the capacitor 168 may have a capacity of 1 microfarad. The screen electrode of the pentode 124 is connected through a resistor 170 to the positive terminal of the 150 volt direct voltage source. The screen electrode is by-passed to ground through a capacitor 172. The resistor 170 may have a resistance of 24 kilo-ohms, for example, and the capacitor 172 may have a capacity of 1 microfarad.

The suppressor electrode of the pentode 124 is connected to the cathode, and the anode is connected through a resistor 174 to the cathode of the pentode 118 and to the junction of the capacitors 112 and 114. The resistor 174 may have a resistance of 10 ohms, for example.

The clamping circuit 52 operates in the manner described above to control the conductivity of the diode 62. During the quiescent state of the system, the output from the gate control generator 50 is relatively high, so that the triode 102 is fully conductive. When the triode 102 is in its fully conductive state, the resulting voltage drop across the resistor 74 is such that the diode 62 is non-conductive. However, upon the introduction of the start pulse to the gate control generator 50, the resulting negative-going output pulse from the gate control generator renders the triode 102 non-conductive. This causes the anode of the diode 62 to be established at essentially +250 volts, so that the diode 62 becomes conductive, as fully described above.

The circuitry of the pentodes 116, 118, 122 and 124 represents an appropriate embodiment for the unity-gain amplifier 70, and the amplifier operates in known manner to maintain the ramp signals linear, as described above.

As noted above, the cathode of the diode 58 in FIGURES 4 and 5, is also connected to the negative threshold detector 64. Appropriate circuitry for the detector is shown in FIGURE 6. As illustrated in FIGURE 6, the input terminal 200 of the negative threshold detector 64 receives the signal from the capacitor 60 corresponding to the charge across the capacitor, as noted above.

The input terminal 200 in FIGURE 6 is connected to the cathode of a diode 202. The anode of the diode 202 is connected to the junction of a resistor 204 and a capacitor 206. The capacitor 206 may have a capacity of .22 microfarad, and it is connected to the output terminal 208 of the detector circuit. This output terminal, as described in conjunction with FIGURE 4, is connected to the video amplifier 80.

The resistor 204, on the other hand, may have a resistance of 1 megohm, and this resistor is connected to the cathode of a diode 210. The cathode of the diode 210 is also connected to a grounded capacitor 212, and the resistor 214 is shunted across the anode and cathode of the diode. The capacitor 212 may have a capacity of .01 microfarad, and the resistor 214 may have a resistance of 470 kilo-ohms.

The anode of the diode 210 is connected to the movable arm of the potentiometer 66 referred to in conjunction with FIGURE 4. This arm of the potentiometer is connected to a grounded capacitor 216 which may, for example, have a capacity of .01 microfarad. The potentiometer 66 is connected through a resistor 218 to the positive terminal of the 250 volt direct current source. This resistor may have a resistance of 100 kilo-ohms, for example. The other terminal of the potentiometer 66 is connected to a resistor 220, and this resistor is connected to the junction of a pair of grounded resistors 222 and 224. The resistor 220 may have a resistance of 100 kilo-ohms, the resistor 222 may have a resistance of 12 kilo-ohms, and the resistor 224 may have a resistance of 8200 ohms.

The setting of the movable arm of the potentiometer 66 determines the amplitude of the charge potential to appear across the capacitor 212. This charge potential across the capacitor 212, in turn, determines the anode bias to be introduced to the diode 202. This anode bias establishes the threshold of the detector 64, so that no signal is passed to the output terminal 208 until the signal introduced to the input terminal 202 decreases in amplitude below the established threshold. Just as soon as the signal introduced to the input terminal 200 is negative with respect to the established threshold, the detector permits a signal to be passed to the output terminal 208. This signal is amplified in the video amplifier 80, as described in conjunction with FIGURE 4, and for the above described purposes.

The invention provides, therefore, a relatively simple system which is capable of measuring extremely small intervals, and of precisely and accurately making such a measurement. The improved system of the invention is advantageous because it enables such precise time measurements to be made by digital counters having reasonable capabilities. The system of the invention is also advantageous because it is constructed and conceived so that parameter variations in the system tend to be self-neutralizing and do not contribute to measurement errors.

What is claimed is:

1. A system for measuring the time interval between a first pulse and a second pulse tincluding in combination, capacitor means having a first terminal coupled to a reference potential and a second terminal, resistance means connected between said second terminal and said reference potential, potential supply means for providing a fixed direct current potential with respect to said reference potential, first and second diodes each having a first electrode coupled to said second terminal and a second electrode, first circuit means coupling said second electrode of said first diode to said potential supply means to charge said capacitor means through said first diode to a predetermined level, second circuit means coupling said second electrode of said second diode to said potential supply means, and control means adapted to receive the first and second pulses and including clamping means and means providing a given potential, said clamping means selectively applying said given potential to said second electrode of said second diode to control the conductivity thereof, said control means being responsive to the first pulse to cause said clamping means to bias said second diode to conduction so that said second circuit means supplies a charging current to said capacitor means whereby the charge thereon increases from said predetermined level at a rate determined by said second circuit means and said capacitor means, said control means being responsive to the second pulse to cause said clamping means to bias said second diode to non-conduction so that said capacitor means discharges through said resistance means, whereby the charge on said capacitor means decreases to said predetermined level at a rate determined by said capacitor means and said resistance means.

2. A system in accordance with claim 1 further including amplifier means having an input coupled to said second terminal and an output coupled to said second circuit means and to said resistance means, said amplifier means being responsive to said charge on said capacitor means to apply a potential to said second circuit means and said resistance means whereby said increase and decrease in said charge across said capacitor means are maintained at rates which are linear functions of time.

3. A system for measuring the time interval between a first pulse and a second pulse including in combination, capacitor means having a first terminal coupled to a reference potential and a second terminal, resistance means connected between said second terminal and said reference potential, potential supply means for providing a fixed direct current potential with respect to said reference potential, a first diode having a first electrode coupled to second terminal and a second electrode, control means adapted to receive the first and second pulses and including means coupling said potential supply means to said second electrode of said first diode to charge said capacitor means through said first diode to a predetermined level, first circuit means including a second diode having a first electrode coupled to said second terminal and a second electrode coupled to said potential supply means, said control means including clamping means and means providing a given potential and selectively applying said given potential to said second electrode of said second diode to control the conductivity thereof, said control means being responsive to the first pulse to render said first diode non-conductive and to cause said clamping means to bias said second diode to conduction so that said first circuit means supplies a charging current to said capacitor means whereby the charge thereon increases from said predetermined level at a rate determined by said first circuit means and said capacitor means, said control means being responsive to the second pulse to cause said clamping means to bias said second diode to non-conduction so that said capacitor means discharges through said resistance means whereby the charge on said capacitor means decreases to said predetermined level at a rate determined by said resistance means and said capacitor means, and threshold detector means coupled to said second terminal and responsive to the decrease in the charge on said capacitor means to said predetermined level to generate an output signal.

4. The system of claim 3 further including amplifier means having an input coupled to said second terminal and an output coupled to said first circuit means and to said resistance means, said amplifier means being responsive to said charge on said capacitor means to apply a potential to said first circuit means and to said resistance means whereby said increase and decrease in said charge across said capacitor means are maintained at rates which are linear functions of time, oscillator means, counter means, gate means selectively connecting said oscillator means to said counter means, second circuit means connected to said gate means for applying the second pulse thereto and causing said gate means to pass said oscillator output to said counter means, and third circuit means connecting said threshold detector means to said gate means for applying said output signal thereto to operate said gate and prevent the same from passing said oscillator output to said counter means.

References Cited by the Examiner
UNITED STATES PATENTS 3,013,208  12/1961  Voznak _____ 324—68

WALTER L. CARLSON, *Primary Examiner.*